W. B. FRISBIE.
VARIABLE SPEED PULLEY.
APPLICATION FILED FEB. 1, 1910.
980,239.
Patented Jan. 3, 1911.
3 SHEETS—SHEET 2.
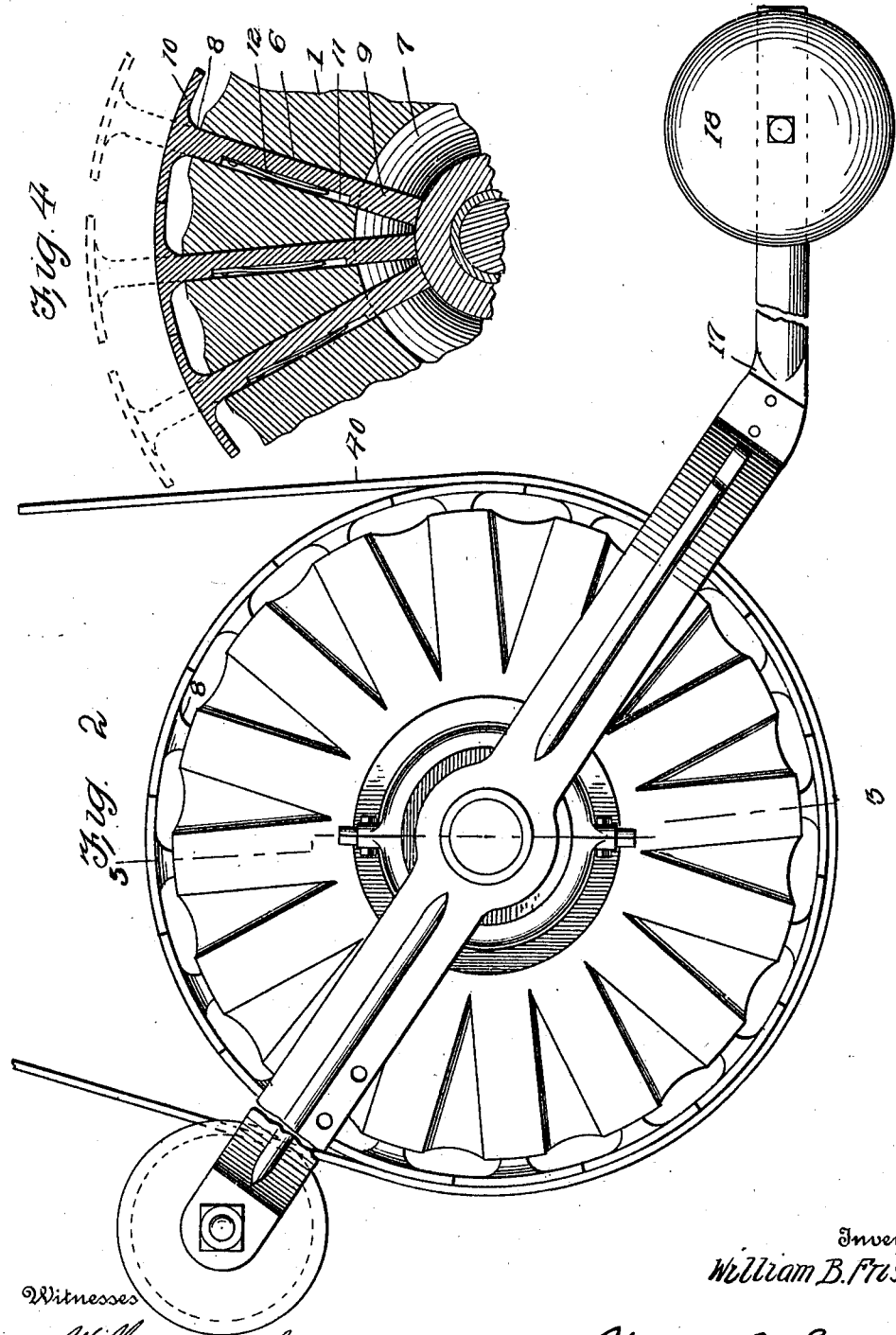

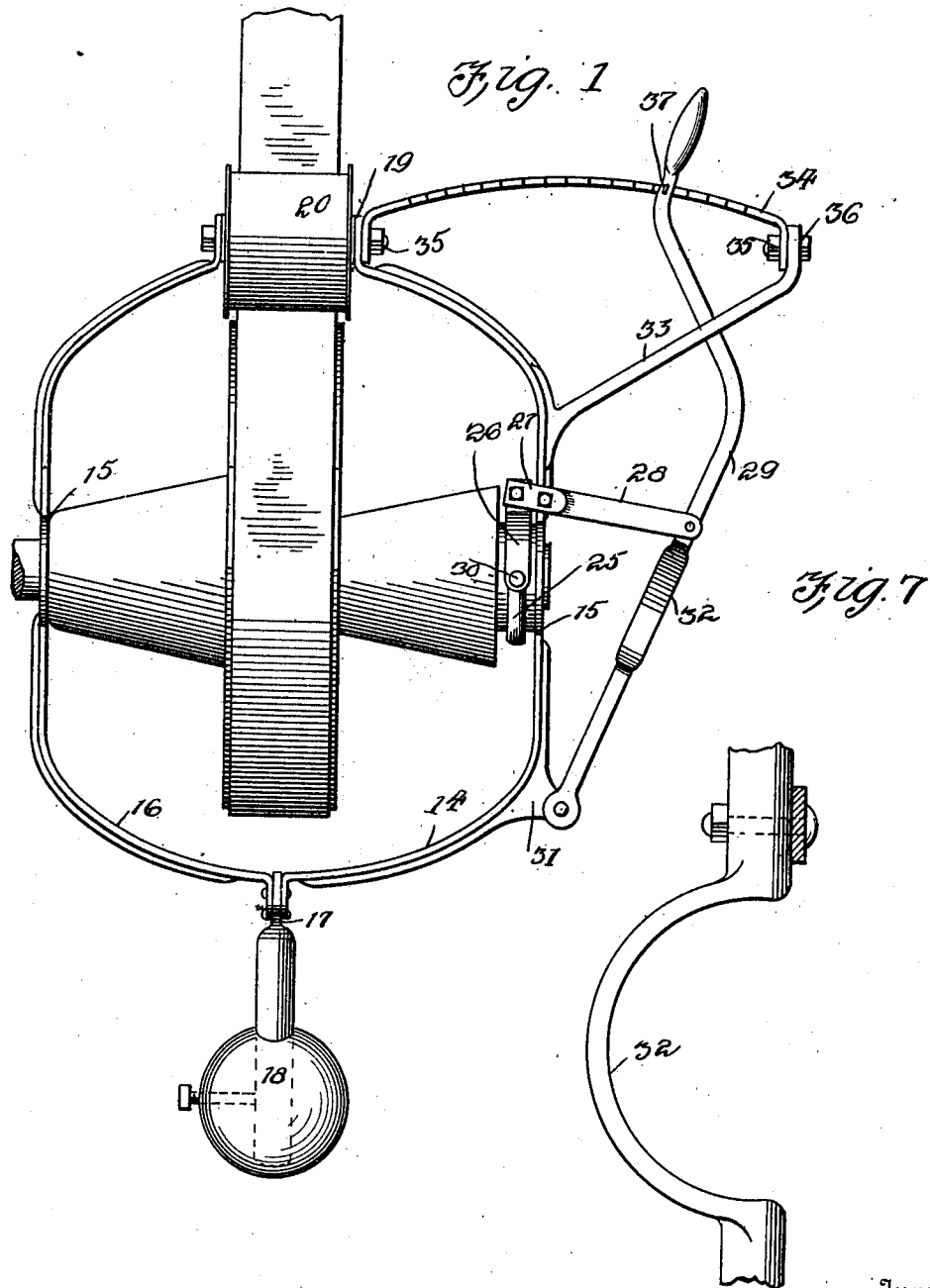

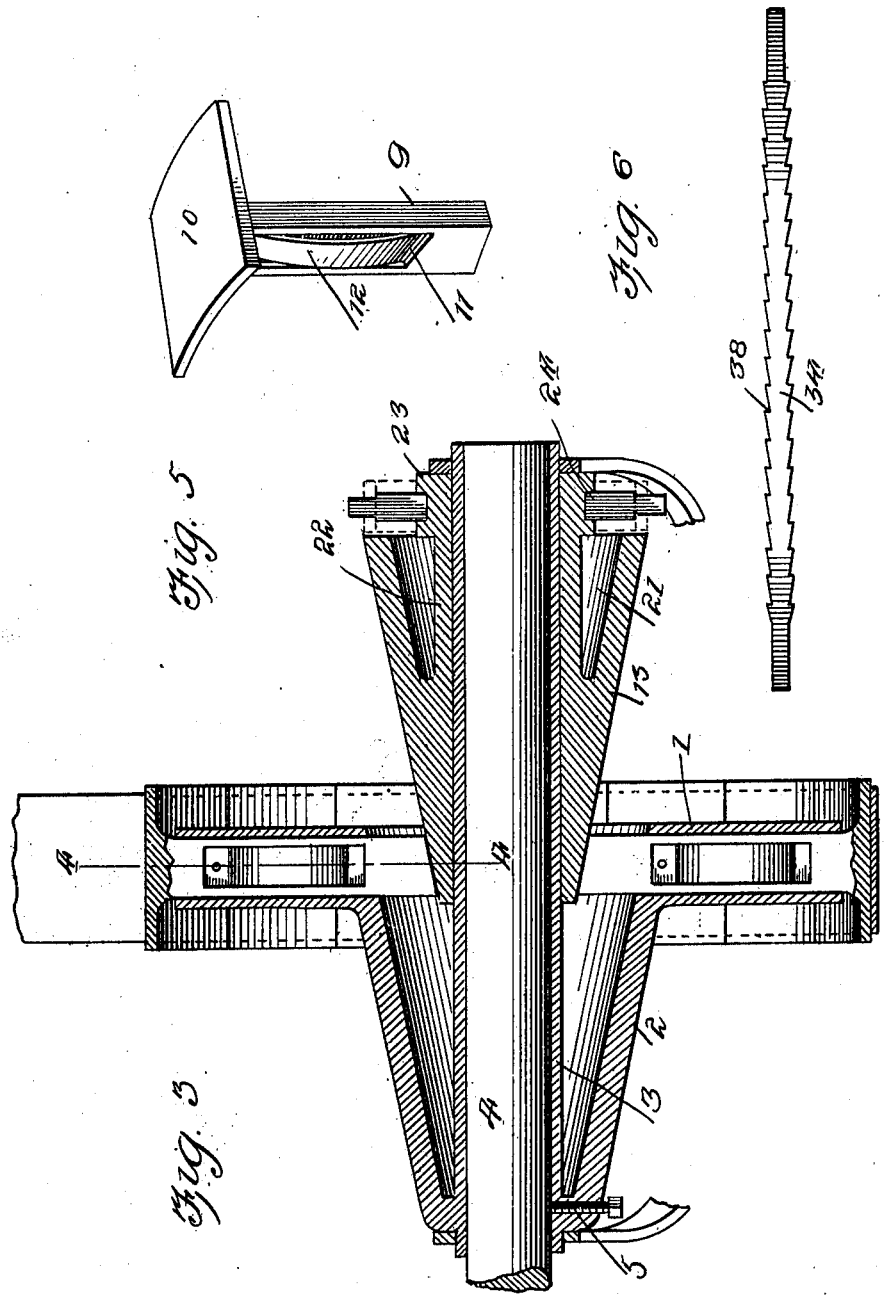

UNITED STATES PATENT OFFICE.

WILLIAM B. FRISBIE, OF LYNDONVILLE, NEW YORK.

VARIABLE-SPEED PULLEY.

980,239. Specification of Letters Patent. Patented Jan. 3, 1911.

Application filed February 1, 1910. Serial No. 541,341.

*To all whom it may concern:*

Be it known that I, WILLIAM B. FRISBIE, a citizen of the United States, residing at Lyndonville, in the county of Orleans and State of New York, have invented new and useful Improvements in Variable-Speed Pulleys, of which the following is a specification.

The invention relates to an improvement in belt pulleys, being more particularly directed to a belt pulley so constructed as to permit its adjustment to vary the diametrical extent of the belt engaging portion, whereby the speed imparted to the shaft on which the pulley is mounted may be varied at pleasure without interfering with the normal speed of the belt.

The main object of the present invention is the provision of a speed adjusting pulley in which the belt engaging portion is made up of a series of independent members mounted for sliding movement on lines radial of the pulley, the construction including a manually controlled adjusting means whereby the belt engaging portions may be simultaneously and uniformly adjusted with relation to the center of the pulley in accordance with the particular speed desired.

The invention in its preferred details of construction will be described in the following specification, reference being had particularly to the accompanying drawings, in which:—

Figure 1 is a view in edge elevation of the improved pulley. Fig. 2 is a view in side elevation of the improved pulley, the manually operable means being omitted. Fig. 3 is a section on line 3—3 of Fig. 2. Fig. 4 is a section on line 4—4 of Fig. 3. Fig. 5 is a perspective view of one of the auxiliary rim sections. Fig. 6 is a plan of the notched bar for the adjusting lever. Fig. 7 is a broken elevation of the adjusting lever.

Referring particularly to the accompanying drawings, the improved pulley comprises a body 1 of substantial structure having a maximum diameter corresponding approximately to the minimum size for which the pulley is adapted. Projecting centrally and laterally of the body 1 is a hollow cone shaped housing 2 within which is arranged a sleeve 3 extending axially of the body 1 and adapted in the use of the pulley to embrace the shafting 4 which the pulley is designed to operate, a set screw or other fastening 5 serving to secure the body 1, housing 2 and sleeve 3 in fixed relation to the shaft. The body 1 is formed with a series of radial sockets or openings 6, which extend through the fixed peripheral surface of the body at one end and at the opposite end open through a central opening 7 of the body which opening corresponds in size to the maximum interior dimension of the housing 2. In each socket 6 there is mounted what I term an auxiliary rim section 8. The rim sections are of duplicate construction each including a standard or stem 9 of a size to be freely slidable in the socket 6 without lost motion, and a plate 10 is secured at the outer end of the stem to prevent independent movement of the auxiliary rim sections as they are successively freed from the influence of the belt in the operation of the pulley. I prefer to recess the stem of each of said sections, as at 11, and mount in each recess a leaf spring 12 designed to engage the adjacent wall of the socket, the tension of the spring being sufficient to maintain the stems in their adjusted position against accidental displacement. The stems 9 have a length less than the radial length of the body 1, and their inner ends are formed on an incline corresponding to the inclination of the inner surface of the housing 2. The plates 10 have a width exceeding that of the body 1 and a length circumferentially of the pulley so that when the stems are at their inward limit of movement the respective plates will present an edge contact to afford a practically unbroken surface circumferentially of the pulley, as more clearly shown in Fig. 4.

Slidably mounted upon the sleeve 4 is an adjusting member 13 comprising a cone corresponding in external dimensions to the similar interior dimensions of the housing 2. The cone adjuster is designed to at all times engage the inner ends of the stems 9, said stems when in engagement with the cone adjuster at its point of least diametrical extent being so arranged as to dispose the plates 10 to provide a pulley of the least diameter. Mounted upon the respective ends of the sleeve 3 is a belt tightener including duplicate members 14 centrally formed with openings 15 to engage the ends of the sleeve and project beyond said openings in rounded sections 16 which are secured to a rod 17 adjustably carrying a weight 18 and at the opposite end engage and support a shaft 19 on which is mounted a grooved pressure roller 20, for a purpose which will presently appear.

The cone adjuster 13 is formed in its outer or larger end with a cone shaped depression 21, extending for a portion of the length of the adjuster and designed to lighten the construction at this point. The inner wall 22 of the depression is extended beyond the outer end of the adjuster and circumferentially enlarged at 23, being formed in such portion 23 with an annular channel 24. Rotatably mounted in the channel 24 is a ring 25 to which at diametrically opposite points is secured a semi-circular link 26 made up of two quadrants having laterally bent portions at their meeting ends to provide for their connection and to permit the securing thereto of a member 27 in turn connected by a link 28 to an operating lever 29. The link 26 is preferably secured in place by forming the ring engaging terminals thereof with openings designed to fit over and engage pins 30 projecting from the ring. One of the members 14 of the belt tightener is formed with an offset 31 on which the lower end of the adjusting lever 29 is pivotally mounted, said lever being formed at an appropriate point with a semi-circular offset 32 whereby to permit the operation of the lever without interfering with the shaft 4. A brace bar 33 is secured to the belt tightener member above the shaft 4, and is formed at its outer end to receive a notched bar 34. The bar 34 is preferably curved in elevation having its terminals bent laterally, as at 35, to engage the projecting end of the shaft 19 and to be secured by a bolt 36 to the end of the brace bar 33. The lever 29 passes between and on opposite sides of the brace and notched bar, being formed with a projection 37 whereby any of the notches 38 in the bar 34 may be engaged.

In the use of the improvement a belt 40 passing about the pulley engages the plates 10 of the auxiliary rim sections, bears beneath the pulley 20 which under the influence of the weight 18 serves to accommodate itself to the belt in the adjustment of the pulley so as to prevent undue slack in the reduction of the size of the pulley.

By the operation of the lever 29 the cone adjuster 13 may be moved within or withdrawn from the housing 2. In the inward movement of the adjuster it will be understood that the respective auxiliary rim sections are forced outwardly, thereby increasing the diametrical extension of the pulley, while in the opposite movement of the adjuster the auxiliary rim sections are free to move inwardly to the desired extent under the pressure from the belt, thereby reducing the diametrical extent of the pulley.

By the construction described it is obvious that by the simple manipulation of the lever 29 the pulley may be varied in diametrical size from the maximum to the minimum permitted in the particular pulley, and as the construction of the parts in any and all sizes is contemplated the invention provides a means whereby a great variety of speeds may be obtained from the single pulley by the simple adjustment of the belt.

Having thus described the invention, what is claimed as new, is:—

1. A variable speed pulley including a body, a series of auxiliary rim sections radially movable in the body, a belt tightener movably mounted on the body, and means carried in part by the belt tightener for adjusting the auxiliary sections radially of the body.

2. A pulley including a body, a housing projecting axially therefrom, a series of auxiliary rim sections mounted for radial movement in the body, a cone adjuster slidably mounted on the body and adapted for movement to and from the housing, said adjuster being adapted to operate the rim sections, a belt tightener mounted on the body, and means carried by the belt tightener for securing the adjuster in desired position.

3. A variable speed pulley including a body formed with a series of radial openings, a housing integral with and projecting axially of the body, an auxiliary rim section slidably mounted in each opening in the body, said section comprising a belt engaging plate and a stem fitting in the opening, the stem being formed with a recess, and a spring secured in the recess and bearing against the wall of the body opening to prevent accidental movement of the section, a cone adjuster to engage the inner ends of the stems, a belt tightener mounted on the body, a lever mounted on the belt tightener, a connection between the lever and the cone adjuster, and means carried by the belt tightener to secure the lever in adjusted position.

4. A variable speed pulley including a body formed with a series of radial openings, a housing projecting axially of the body, a sleeve projecting axially of the body and extending beyond said housing and body, a series of auxiliary rim sections mounted in the body openings, a cone adjuster slidably mounted on the sleeve and adapted in movement in one direction to seat within the housing, the inner ends of the rim sections bearing on the surface of the adjuster, a belt tightener mounted on the sleeve beyond the body and housing, a member mounted for independent rotation on the adjuster, a lever pivotally mounted on the tightener, a connection between said ring and lever, and means for securing the lever in desired position.

In testimony whereof I affix my signature in presence of two witnesses.

WILLIAM B. FRISBIE.

Witnesses:
ROBERT C. SMYTHE,
M. F. CUMMINGS.